(12) United States Patent
Jikuhara et al.

(10) Patent No.: US 12,474,709 B2
(45) Date of Patent: Nov. 18, 2025

(54) SERVER APPARATUS, SYSTEM, AND OPERATING METHOD OF SYSTEM

(71) Applicant: TOYOTA JIDOSHA KABUSHIKI KAISHA, Toyota (JP)

(72) Inventors: Yoshikazu Jikuhara, Miyoshi (JP);
Shin Sakurada, Toyota (JP);
Tomokazu Maya, Nagoya (JP);
Hiroyuki Bandai, Toyota (JP);
Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 18/448,404

(22) Filed: Aug. 11, 2023

(65) Prior Publication Data

US 2024/0053755 A1 Feb. 15, 2024

(30) Foreign Application Priority Data

Aug. 15, 2022 (JP) ................. 2022-129423

(51) Int. Cl.
*G05D 1/00* (2024.01)

(52) U.S. Cl.
CPC ......... *G05D 1/0212* (2013.01); *G05D 1/0287* (2013.01)

(58) Field of Classification Search
CPC .... G05D 1/0212; G05D 1/0287; G05D 1/644; G05D 1/697; G05D 2105/28; G05D 2107/70; G05D 2109/10; G05D 1/6987; G05B 19/41895; G06Q 10/06316; G06Q 50/04

See application file for complete search history.

(56) References Cited

U.S. PATENT DOCUMENTS

| | | | |
|---|---|---|---|
| 10,346,784 B1* | 7/2019 | Powell | G06Q 10/0639 |
| 2019/0236534 A1* | 8/2019 | Kaneko | G05D 1/0274 |
| 2021/0041253 A1* | 2/2021 | Walpuck | G08G 1/09 |
| 2022/0058533 A1* | 2/2022 | Ha | G06Q 10/02 |
| 2022/0326029 A1* | 10/2022 | Komamine | G01C 21/3476 |

FOREIGN PATENT DOCUMENTS

| | | | | |
|---|---|---|---|---|
| JP | H06214647 A | | 8/1994 | |
| JP | 2007213283 A | * | 8/2007 | |
| JP | 2019131041 A | * | 8/2019 | ......... G06Q 30/0601 |
| JP | 2021033846 A | * | 3/2021 | |

* cited by examiner

*Primary Examiner* — Rachid Bendidi
*Assistant Examiner* — Nada Mahyoob Alqaderi
(74) *Attorney, Agent, or Firm* — Dickinson Wright, PLLC

(57) ABSTRACT

A server apparatus includes a communication interface and a controller configured to communicate, using the communication interface, with a mobile object having a facility for executing one or more processes in a plurality of processes to be executed sequentially to manufacture a product. The controller is configured to transmit an instruction to a first mobile object to travel to a meeting point with a second mobile object for executing a second process that follows a first process to be executed in the first mobile object, the instruction being for delivering the product being manufactured to the second mobile object at the meeting point.

20 Claims, 6 Drawing Sheets

SERVER APPARATUS, SYSTEM, AND OPERATING METHOD OF SYSTEM

CROSS-REFERENCE TO RELATED APPLICATION

This application claims priority to Japanese Patent Application No. 2022-129423, filed on Aug. 15, 2022, the entire contents of which are incorporated herein by reference.

TECHNICAL FIELD

The present disclosure relates to a server apparatus, a system, and an operating method of a system.

BACKGROUND

Multiple manufacturing processes are performed during the manufacturing of various industrial products. Various technologies have been proposed to assist in the management of manufacturing processes. For example, Patent Literature (PTL) 1 discloses an automatic transportation vehicle that transports parts between manufacturing lines in a factory.

CITATION LIST

Patent Literature

PTL 1: JP H06-214647 A

SUMMARY

There are challenges in carrying out conventional manufacturing processes, such as securing sites for factories and improving logistics for parts and finished products.

It would be helpful to disclose a server apparatus and the like that can reduce the need to secure land for factories and can improve logistics.

A server apparatus in the present disclosure includes:
a communication interface; and
a controller configured to communicate, using the communication interface, with a mobile object having a facility for executing one or more processes in a plurality of processes to be executed sequentially to manufacture a product, wherein
the controller is configured to transmit an instruction to a first mobile object to travel to a meeting point with a second mobile object for executing a second process that follows a first process to be executed in the first mobile object, the instruction being for delivering the product being manufactured to the second mobile object at the meeting point.

A system in the present disclosure is a system including a mobile object having a facility for executing one or more processes in a plurality of processes to be executed sequentially to manufacture a product and a server apparatus configured to communicate with the mobile object, wherein
the server apparatus is configured to transmit an instruction to a first mobile object to travel to a meeting point with a second mobile object for executing a second process that follows a first process to be executed in the first mobile object, the instruction being for delivering the product being manufactured to the second mobile object at the meeting point, and
the first mobile object is configured to travel in response to the instruction.

An operating method of a system in the present disclosure is an operating method of a system including a mobile object having a facility for executing one or more processes in a plurality of processes to be executed sequentially to manufacture a product and a server apparatus configured to communicate with the mobile object, the operating method including:
transmitting, by the server apparatus, an instruction to a first mobile object to travel to a meeting point with a second mobile object for executing a second process that follows a first process to be executed in the first mobile object, the instruction being for delivering the product being manufactured to the second mobile object at the meeting point; and
traveling, by the first mobile object, in response to the instruction.

The server apparatus and the like in the present disclosure can reduce the need to secure land for factories and can improve logistics.

BRIEF DESCRIPTION OF THE DRAWINGS

In the accompanying drawings.

DETAILED DESCRIPTION

Embodiments are described below.

Figure 1:
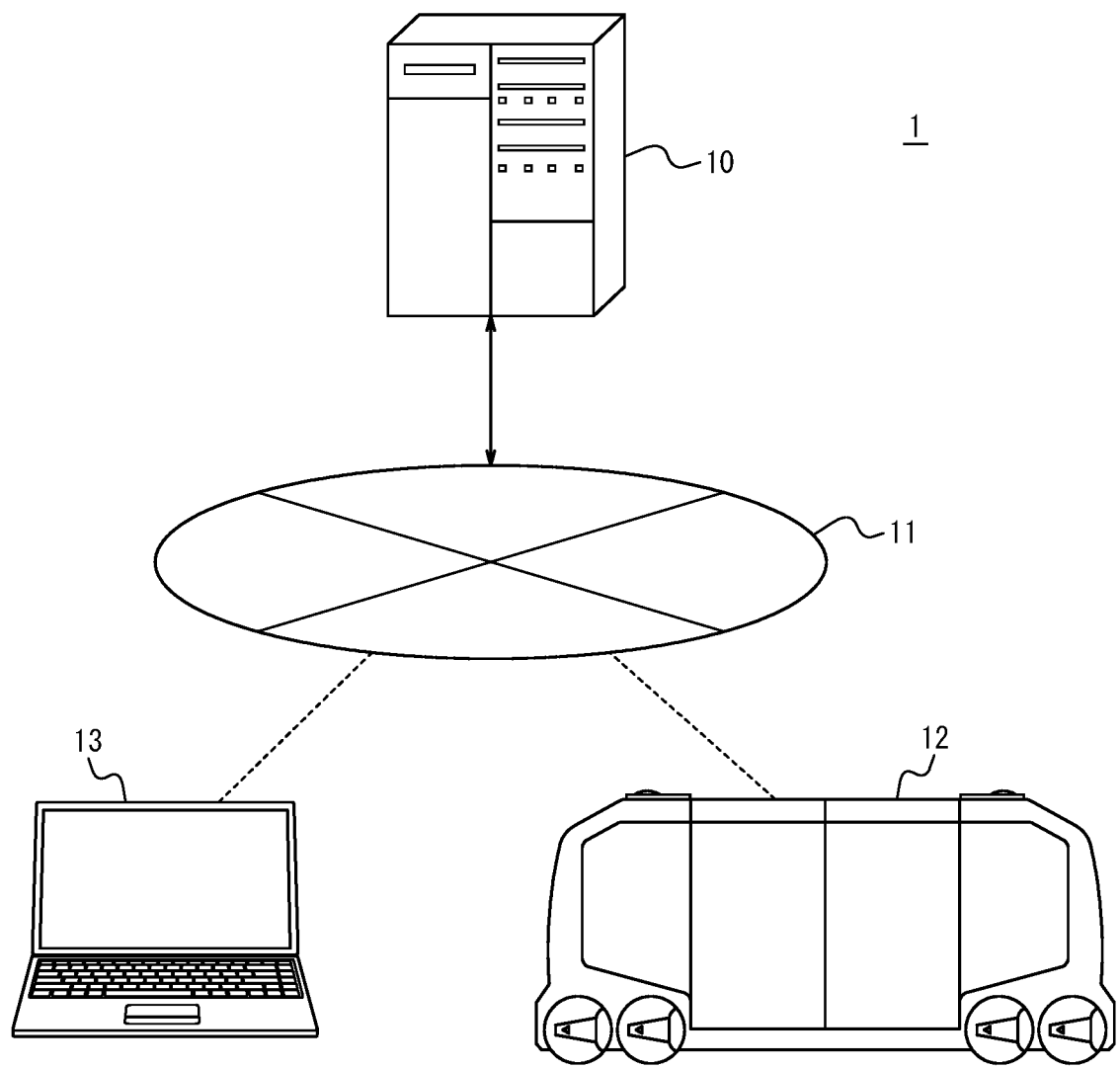
FIG. 1 is a diagram illustrating an example configuration of an information processing system.

FIG. 1 is a diagram illustrating a configuration example of an information processing system according to an embodiment. An information processing system 1 includes one or more each of a server apparatus 10, a mobile object 12, and an information processing apparatus 13 communicably connected to each other via a network 11. In the information processing system 1, processes to manufacture a product are executed at the mobile object 12 under the control of the server apparatus 10.

The server apparatus 10 is, for example, a server computer that belongs to a cloud computing system or other computing system and functions as a server that implements various functions.

The mobile object 12 includes a manufacturing facility for executing processes to manufacture a product. The product is an industrial product, such as electronic devices, electrical appliances, and vehicles, manufactured by machining or assembling parts and components. The manufacturing processes are processes for machining or assembling parts and components. The manufacturing processes may be executed in whole or in part manually by workers. The mobile object 12 is connected to the network 11 via a mobile communication network. The mobile object 12 is driven manually, but a portion of driving may be automated. The mobile object 12 is any type of automobile such as a gasoline vehicle, a Battery Electric Vehicle (BEV), a Hybrid Electric Vehicle (HEV), a Plug-in Hybrid Electric Vehicle (PHEV), or a Fuel Cell Electric Vehicle (FCEV).

The information processing apparatus 13 is used by an operator managing the manufacturing processes to transmit various instructions to the server apparatus 10 and receive various output information from the server apparatus 10. Examples of the information processing apparatus 13 include a personal computer (PC) and a tablet terminal apparatus.

The network 11 is the Internet, for example, but may also be an ad-hoc network, a LAN, a Metropolitan Area Network (MAN), other networks, or a combination of two or more thereof.

In the present embodiment, the server apparatus 10 includes a controller that communicates, using a communication interface, with the mobile object 12 that has a manufacturing facility for executing one or more manufacturing processes in a plurality of manufacturing processes to be executed sequentially to manufacture a product. The controller transmits an instruction to a first mobile object 12 to travel to a meeting point with a second mobile object 12 for executing the manufacturing process that follows the manufacturing processes to be executed in the mobile object 12, the instruction being for delivering the product being manufactured (hereinafter referred to as the semi-finished product) to the second mobile object 12 at the meeting point. In this way, manufacturing processes can be distributed and executed in the traveling mobile objects 12, reducing the need to secure a site for a plant to consolidate a plurality of manufacturing processes. Furthermore, logistics can be improved, because it is possible to receive supplies of parts and materials while manufacturing products and to transfer semi-finished products and finished products.

Figure 2:
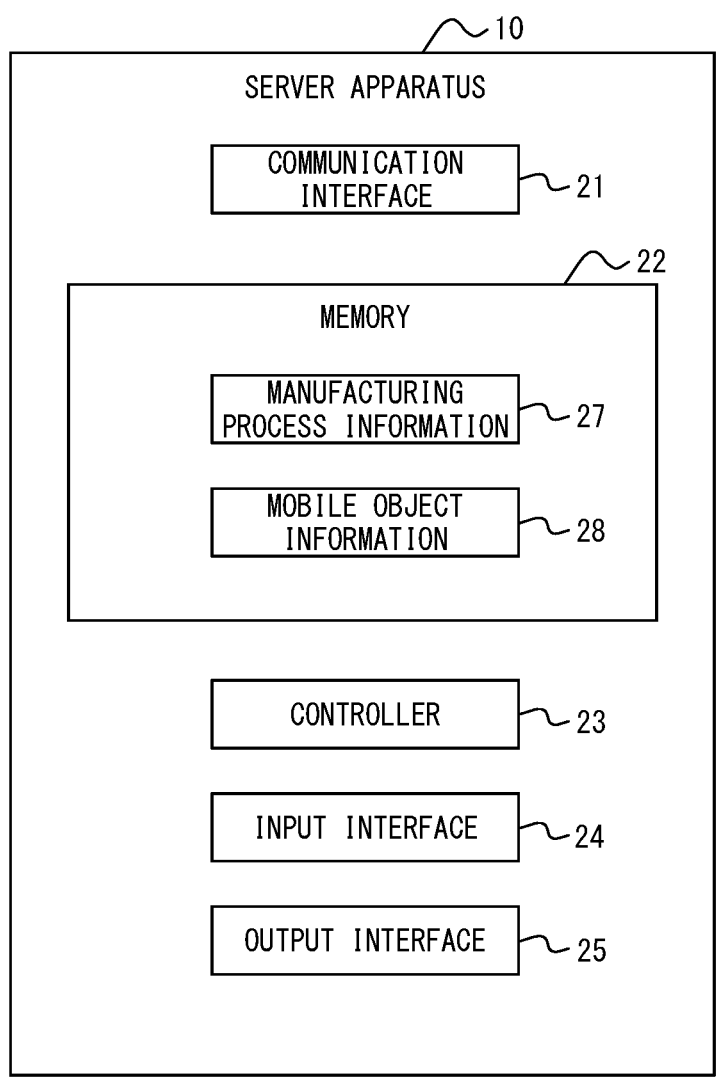
FIG. 2 is a diagram illustrating an example configuration of a server apparatus.

FIG. 2 illustrates an example configuration of the server apparatus 10. The server apparatus 10 includes a communication interface 21, a memory 22, a controller 23, an input interface 25, and an output interface 26. The server apparatus 10 is, for example, a single computer. The server apparatus 10 may be two or more server computers that are communicably connected to each other and operate in cooperation. In this case, the configuration illustrated in FIG. 2 can be arranged among two or more server computers as appropriate.

The communication interface 21 includes one or more interfaces for communication. The interface for communication is, for example, a LAN interface. The communication interface 21 receives information to be used for the operations of the server apparatus 10 and transmits information obtained by the operations of the server apparatus 10. The server apparatus 10 is connected to the network 11 by the communication interface 21 and communicates information with the mobile object 12 or the information processing apparatus 13 via the network 11.

The memory 22 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 22 stores information to be used for the operations of the server apparatus 10 and information obtained by the operations of the server apparatus 10. The memory 22 stores manufacturing process information 27 and mobile object information 28. The manufacturing process information 27 includes information such as the manufacturing processes required for each type of product and their sequence, the types of parts and materials required for each manufacturing process, the supply points where parts and materials are supplied, and the type of manufacturing facility required to execute each process. Supply points are, for example, warehouses or distribution centers.

The mobile object information 28 includes information such as identification information for each mobile object 12, the type of manufacturing facility to be installed, the manufacturing processes that can be executed at the manufacturing facility, and the time required to execute each manufacturing process (hereinafter referred to as process time).

The controller 23 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated d circuit is, for example, a field-programmable gate array (FPGA), an application specific integrated circuit (ASIC), or the like. The controller 23 executes information processing related to operations of the server apparatus 10 while controlling components of the server apparatus 10.

The input interface 25 includes one or more interfaces for input. The interface for input is, for example, a physical key, a capacitive key, a pointing device, a touch screen integrally provided with a display, or a microphone that receives audio input. The input interface 25 accepts operations to input information used for operation of the server apparatus 10 and transmits the inputted information to the controller 23.

The output interface 26 includes one or more interfaces for output. The interface for output is, for example, a display or a speaker. The display is, for example, a Liquid Crystal Display (LCD) or an organic Electro Luminescent (EL) display. The output interface 26 outputs information obtained by the operations of the server apparatus 10.

The functions of the server apparatus 10 are realized by a processor included in the controller 23 executing a control program. The control program is a program for causing a computer to execute the processing of steps included in the operations of the server apparatus 10, thereby enabling the computer to realize the functions corresponding to the processing of the steps. That is, the control program is a program for causing a computer to function as the server apparatus 10. Some or all of the functions of the server apparatus 10 may be realized by a dedicated circuit included in the controller 23. The control program may be stored on a non-transitory recording/storage medium readable by the server apparatus 10 and be read from the medium by the server apparatus 10.

Figure 3:
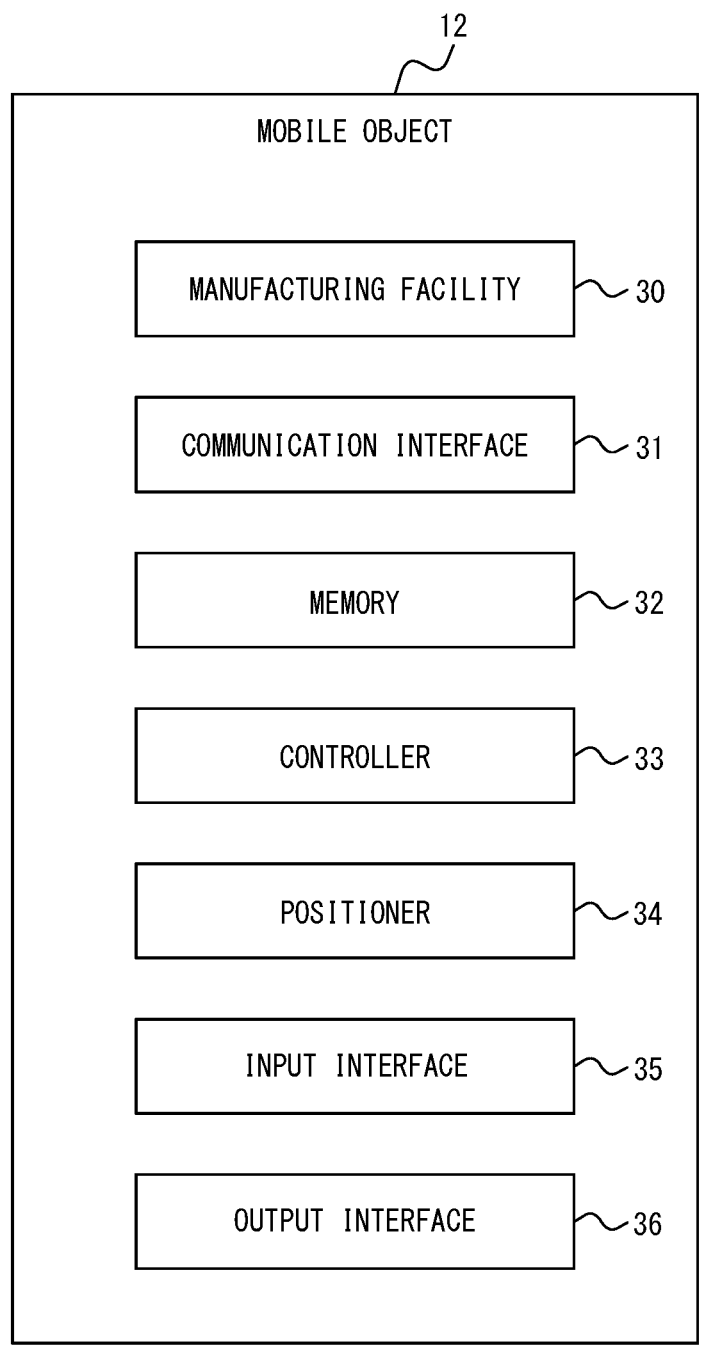
FIG. 3 is a diagram illustrating an example configuration of a mobile object.

FIG. 3 illustrates a configuration example of the mobile object 12. In addition to a manufacturing facility 30 for executing manufacturing processes, the mobile object 12 includes a communication interface 31, a memory 32, a controller 33, a positioner 34, an input interface 35, and an output interface 36. These components may be configured as a single control apparatus, by two or more control apparatuses, or by other apparatuses, such as a control apparatus and a communication device. The control apparatus includes an electronic control unit (ECU), for example. The communication device includes a data communication module (DCM), for example. The control apparatus may be configured to include a personal computer, a tablet terminal, a smartphone terminal, a navigation apparatus, or the like. The components are communicably connected to each other, or to other devices and apparatuses in the mobile object 12, by an in-vehicle network compliant with standards such as a Controller Area Network (CAN).

The manufacturing facility 30 includes an interior space where parts and components are housed and manufacturing processes are executed, machinery and equipment that executes part or all of the manufacturing processes, and the like. The machinery and equipment is, for example, machinery and equipment for machining or assembling parts and components.

The communication interface 31 includes one or more interfaces for communication. Examples of the interface for communication include an interface corresponding to mobile communication standards, such as Long Term Evolution (LTE), 4th Generation (4G), or 5th Generation (5G). The communication interface 31 receives information to be used for the operations of the controller 33 and transmits information obtained by the operations of the controller 33. The controller 33 connects to the network 11 using the communication interface 31 through a mobile communication base station and communicates information with other apparatuses via the network 11.

The memory 32 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores information to be used for the operations of the controller 33 and information obtained by the operations of the controller 33.

The controller 33 includes one or more processors, one or more dedicated circuits, or a combination thereof. Examples of the processor include a general purpose processor such as a CPU and a dedicated processor dedicated to specific processing. The dedicated circuit is, for example, an FPGA or an ASIC. The controller 33 executes information processing pertaining to operations of the mobile object 12.

The positioner 34 includes one or more Global Navigation Satellite System (GNSS) receivers. The GNSS includes, for example, at least one of Global Positioning System (GPS), Quasi-Zenith Satellite System (QZSS), BeiDou, Global Navigation Satellite System (GLONASS), and Galileo. The positioner 34 acquires the positional information for the mobile object 12 and transmits the positional information to the controller 33.

The input interface 35 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 35 accepts user operations to input information used for operation of the controller 33 and transmits the inputted information to the controller 33.

The output interface 36 includes one or more interfaces for output. The interface for output is, for example, a display or a speaker. The display is, for example, an LCD or an organic EL display. The output interface 36 outputs the information obtained by the operation of controller 33, for example, to the user.

The functions of the controller 33 are realized by a processor included in the controller 33 executing a control program. The control program is a program for causing a computer to execute the processing of steps included in operations of the controller 33, thereby enabling the computer to realize the functions corresponding to the processing of the steps. That is, the control program is a program for causing a computer to function as the controller 33. Some or all of the functions of the controller 33 may be realized by a dedicated circuit included in the controller 33. The controller 33 generates information for control of various mechanisms and apparatuses of the mobile object 12 and transmits the information for control to the control circuits of the various mechanisms and apparatuses to control the mechanisms and apparatuses.

Figure 4:
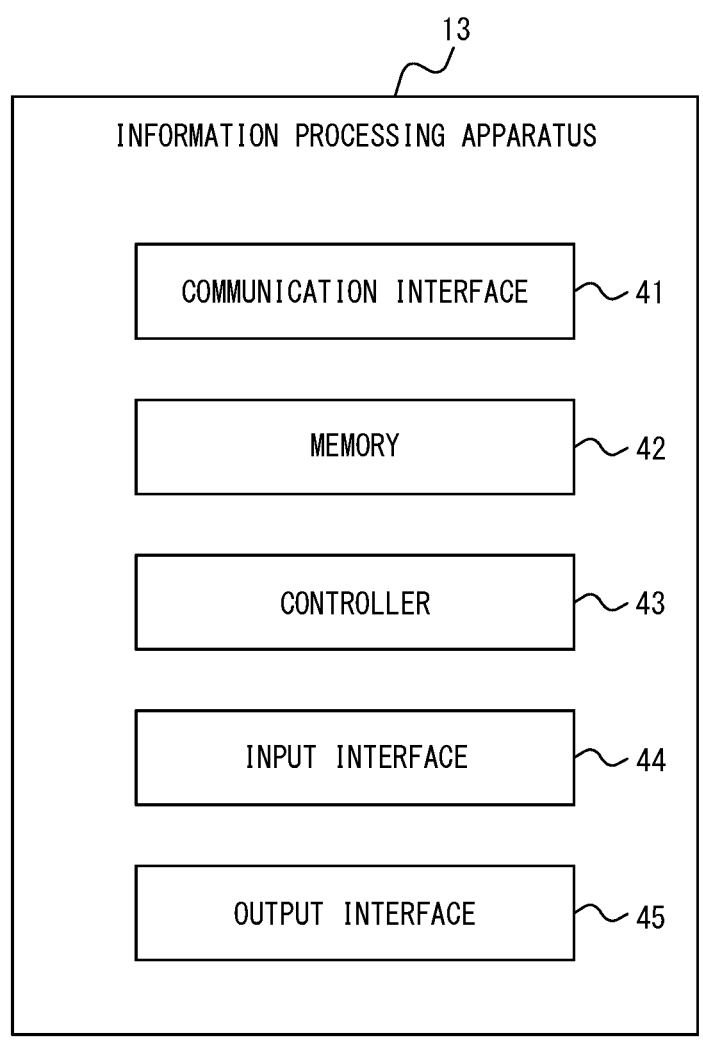
FIG. 4 is a diagram illustrating an example configuration of an information processing apparatus.

FIG. 4 is a diagram illustrating a configuration of the information processing apparatus 13. The information processing apparatus 13 is an information processing apparatus such as a PC. The information processing apparatus 13 includes a communication interface 41, a memory 42, a controller 43, an input interface 45, and an output interface 46.

The communication interface 41 includes a communication module compliant with a wired or wireless LAN standard, a module compliant with a mobile communication standard such as LTE, 4G, or 5G, or the like. The information processing apparatus 13 connects to the network 11 via a nearby router apparatus or mobile communication base station using the communication interface 41 and communicates information with other apparatuses over the network 11.

The memory 42 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 42 functions as, for example, a main memory, an auxiliary memory, or a cache memory. The memory 42 stores information to be used for the operations of the controller 43 and information obtained by the operations of the controller 43.

The controller 43 has one or more general purpose processors such as CPUs or micro processing units (MPUs) or one or more dedicated processors that are dedicated to specific processing. Alternatively, the controller 43 may have one or more dedicated circuits such as FPGAs or ASICs. The controller 43 is configured to perform overall control of the operations of the information processing apparatus 13 by operating according to the control/processing programs or operating according to operation procedures implemented in the form of circuits. The controller 43 then transmits and receives various types of information to and from the server apparatus 10 and the like via the communication interface 41 and executes the operations according to the present embodiment.

The input interface 45 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 45 accepts operations for inputting information to be used in the operations of the controller 43 and transmits the inputted information to the controller 43.

The output interface 46 includes one or more interfaces for output. The interface for output is, for example, a display or a speaker. The display is, for example, an LCD or an organic EL display. The output interface 46 outputs information obtained by the operations of the controller 43.

The functions of the controller 43 are realized by a processor included in the controller 43 executing a control program. The control program is a program for causing the processor to function as the controller 43. Some or all of the functions of the controller 43 may be realized by a dedicated circuit included in the controller 43.

Figure 5:
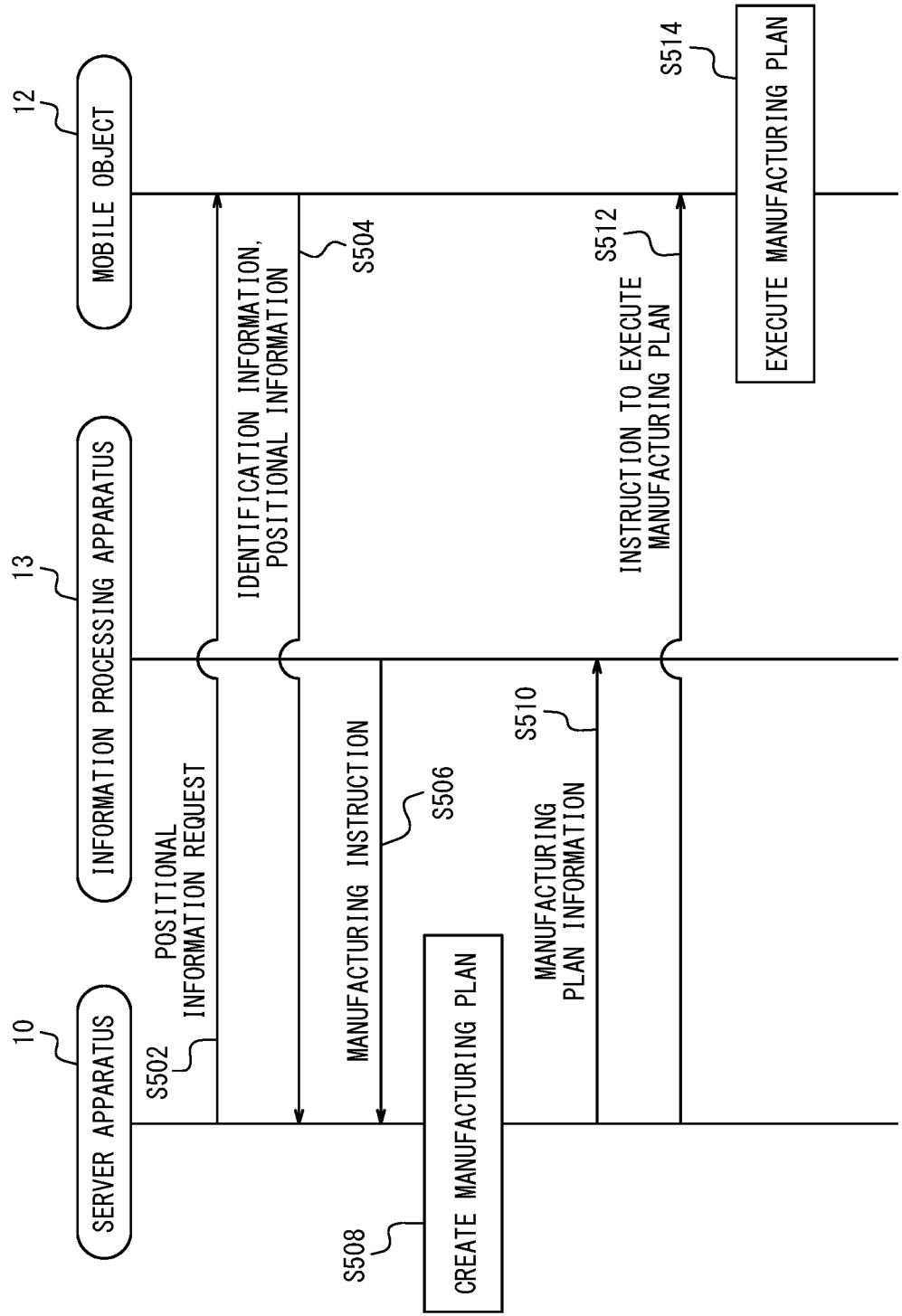
FIG. 5 is a sequence diagram illustrating an operation example of the information processing system.

FIG. 5 is a sequence diagram to illustrate the operating procedures of the information processing system 1 in the present embodiment. FIG. 5 illustrates the steps in the coordinated operation of the server apparatus 10, the mobile object 12, and the information processing apparatus 13. The steps pertaining to the various information processing by the server apparatus 10, the mobile object 12, and the information processing apparatus 13 in FIG. 5 are performed by the respective controllers 23, 33, 43. The steps pertaining to transmitting and receiving various types of information to and from the server apparatus 10, the mobile object 12, and the information processing apparatus 13 are performed by the respective controllers 23, 33, 43 transmitting and receiving information to and from each other via the respective communication interfaces 21, 31, 41. In the server apparatus 10, the mobile object 12, and the information processing apparatus 13, the respective controllers 23, 33, 43 appropriately store the information that is transmitted and received in the respective memories 22, 32, 42. Furthermore, the controllers 23, 33, 43 accept input of various information by the respective input interfaces 35, 45 and output various information by the respective output interfaces 36, 46. The transfer of information between the server apparatus 10 and the mobile object 12 and the operations of the mobile object 12 in FIG. 5 are executed for each mobile object 12 in the case of a plurality of mobile objects 12.

In step S502, the server apparatus 10 issues a request for positional information to the mobile object 12. The positional information is information indicating the current position of the mobile object 12. The server apparatus 10 stores information identifying the mobile objects 12 in the memory 22 in advance and transmits information for requesting the positional information to each mobile object 12 using the identification information.

In step S504, the mobile object 12 transmits its own positional information to the server apparatus 10. The positional information is generated by the controller 33 using information acquired by the positioner 34.

In step S506, the information processing apparatus 13 transmits a manufacturing instruction to the server apparatus 10. The manufacturing instruction is information for instructing that the process to manufacture a product be executed. The manufacturing instruction includes information such as the type of product to be manufactured and the destination of the product.

The operator transmits information identifying the type of product and information on the destination and the like to the server apparatus 10 using the information processing apparatus 13. For example, the operator accesses a site provided by the server apparatus 10 via the information processing apparatus 13, and the server apparatus 10 presents information on the type of product, read from the manufacturing process information 27, and map information. The operator selects the type of product and identifies the destination in the map information using the information processing apparatus 13, and the server apparatus 10 thereby receives the information identifying the type of product, the information on the destination, and the like.

In step S508, the server apparatus 10 creates a manufacturing plan. The manufacturing plan includes information such as the sequence of manufacturing processes to be executed, the route of the mobile object 12 to execute each manufacturing process, and the schedule for travel by each mobile object 12.

Figure 6:
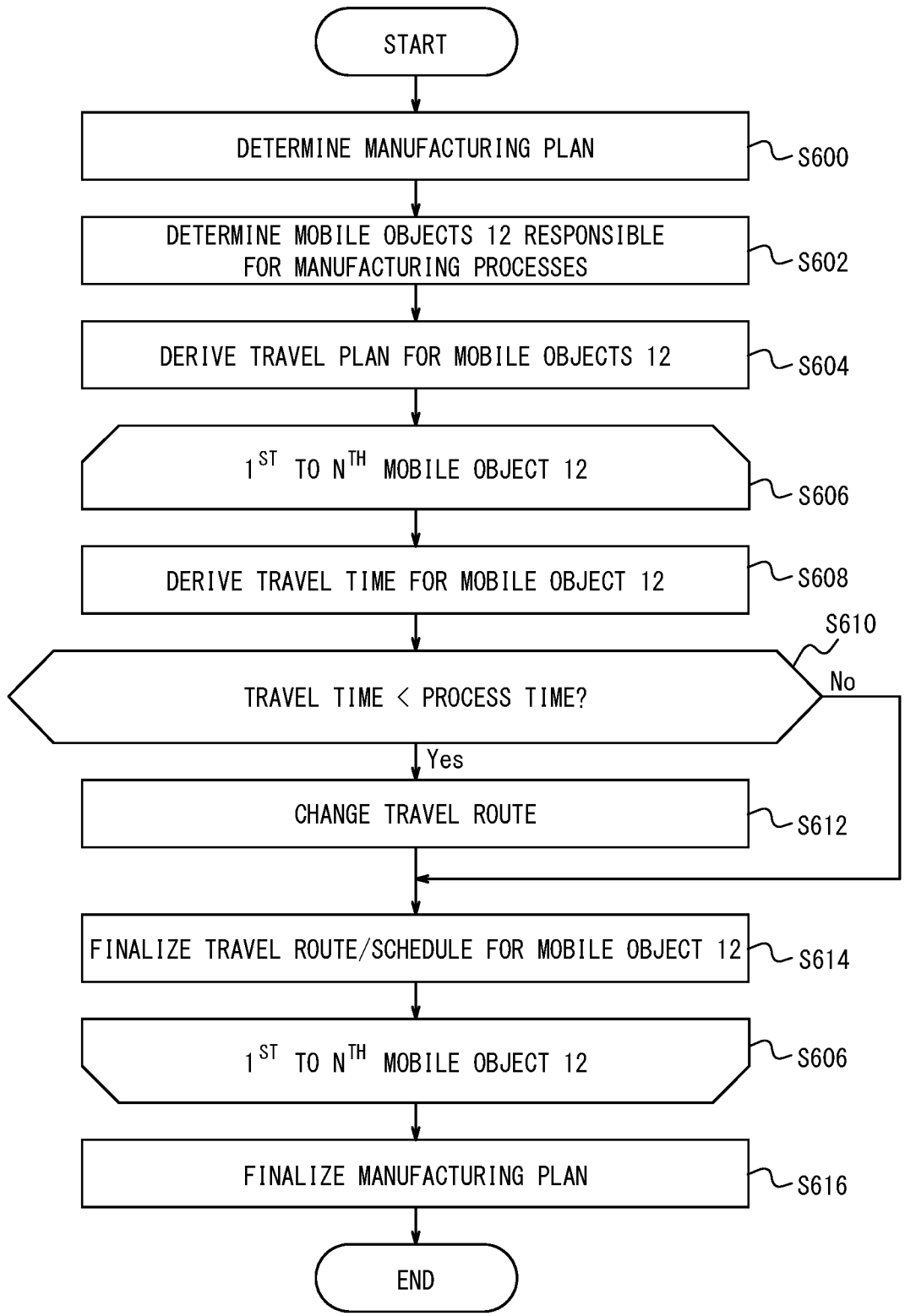
FIG. 6 is a flowchart illustrating an operation example of the server apparatus.

FIG. 6 is a flowchart illustrating a detailed example of the procedures in step S508.

In step S600, the controller 23 of the server apparatus 10 determines the manufacturing processes. The controller 23 refers to the manufacturing process information 27 to read the types of manufacturing processes required to manufacture the product identified by the operator, identifies the manufacturing processes, and acquires the sequence of the manufacturing processes. The sequence includes the case in which one or more manufacturing processes are executed in parallel. For example, this includes the case in which one or more manufacturing processes are executed in parallel and one manufacturing process is then executed after all the parallel manufacturing processes are completed, or the case in which one or more manufacturing processes are executed in parallel after one manufacturing process is completed.

In step S602, the controller 23 of the server apparatus 10 determines the mobile objects 12 responsible for the manufacturing processes. The controller 23 refers to the mobile object information 28 to identify the mobile objects 12 that have the manufacturing facilities 30 for executing the manufacturing processes determined in step S600 and assigns the identified mobile objects 12 to the manufacturing processes. In a case in which a plurality of mobile objects 12 correspond to a certain manufacturing process, the controller 23 selects, for example, the mobile object 12 that is located closest to the current position of the mobile object 12 responsible for the manufacturing process before the certain manufacturing process.

In step S604, the controller 23 derives the travel route for each mobile object 12. Based on the positional information for each mobile object 12, the controller 23 derives a travel route that takes the current position as the starting point and the meeting point for meeting the mobile object 12 responsible for the next manufacturing process as the arrival point. However, in the case of the mobile object 12 responsible for the last manufacturing process, the route is set taking the destination of the completed product as the arrival point. The meeting point is the point at which the mobile object 12 responsible for the previous manufacturing process (hereinafter simply referred to as the mobile object 12 for the previous process) delivers the semi-finished product, obtained by executing its own manufacturing process, to the mobile object 12 responsible for the next manufacturing process (hereinafter simply referred to as the mobile object 12 for the next process). The meeting point is, for example, the current position of the mobile object for the next process, or any point between the current position of the mobile object 12 for the previous process and the mobile object 12 for the next process. The controller 23 refers to the manufacturing process information 27 to identify the parts and materials required in the manufacturing process that each mobile object 12 is responsible for and derives each route so as to pass through a supply point where the identified parts and materials are supplied. In a case in which the supply point is located between the current position of the mobile object 12 for the previous process and the current position of the mobile object 12 for the next process, the supply point may be set as the meeting point. The route is derived using any route search algorithm. The controller 23 may acquire information from the mobile object 12 on the state of charge, remaining fuel, condition of the manufacturing facility 30, and the like, and based on these pieces of information, the controller 23 may add a charging station, refueling station, maintenance shop for the manufacturing facility 30, or the like to the route as transit points.

Next, the controller 23 performs steps S608 to S614 sequentially for N (N being a natural number equal to or greater than one) identified mobile objects 12 (step S606).

In step S608, the controller 23 derives the travel time for the mobile object 12. The travel time is the time required for the mobile object 12 to travel the derived route. The controller 23 acquires, for example, information on the length of the travel route for the mobile object 12 and the legal speed along the travel route from map information, traffic information, and the like stored in the memory 22 in advance and derives the travel time using the length of the travel route and the legal speed.

In step S610, the controller 23 determines whether the process time required to execute the manufacturing process is greater than the travel time for the mobile object 12. The controller 23 reads the process time required for the manufacturing process on the mobile object 12 from the manufacturing process information 27. In a case in which the process time is greater than the travel time (Yes), the controller 23 advances to step S612.

In step S612, the controller 23 changes the travel route. In a case in which the process time is greater than the travel time, there is a high probability that the manufacturing process will not be completed by the time the mobile object 12 arrives at the meeting point, and the mobile object 12 will be forced to park at the meeting point until the manufacturing process is completed. Therefore, the controller 23 derives a detour route such that the travel time is equal to or greater than the process time and changes the travel route to the derived detour route. This can reduce the amount of time that the mobile object 12 for the previous process and the mobile object for the next process are simultaneously parked at the meeting point, thereby reducing the risk of traffic congestion.

In step S614, the controller 23 finalizes the travel route and the schedule for the mobile object 12. The controller 23 determines the schedule using the current time, the travel time for each mobile object 12, the time for delivery at the meeting point, and the like. The time for delivery at the meeting point is freely set in advance.

In step S610, in a case in which the travel time is equal to or greater than the process time (No), there is a high probability that the manufacturing process will be finished by the time the mobile object 12 arrives at the meeting point, and that it will be possible to minimize the time for the mobile object 12 to park at the meeting point and deliver the semi-finished product to the mobile object 12 for the next process. Hence, in that case, the controller 23 does not change the travel route but rather advances to step S614 to finalize the initial travel route.

Once the controller 23 has executed steps S608 to S614 for the N mobile objects 12 (step S606), the controller 23 advances to step S616.

In step S616, the controller 23 finalizes the manufacturing plan, including the travel route and the schedule for the N mobile objects 12.

Returning to FIG. 5, in step S510, the server apparatus 10 transmits manufacturing plan information to the information processing apparatus 13.

The information processing apparatus 13 displays the manufacturing plan to present it to the operator so that the operator can confirm the manufacturing plan. Upon confirming the manufacturing plan, the operator may transmit an instruction to start the manufacturing plan from the information processing apparatus 13 to the server apparatus 10.

In step S512, the server apparatus 10 transmits an instruction to execute the manufacturing plan to each target mobile object 12. The instruction to execute the manufacturing plan includes information on the travel route and the schedule for each mobile object 12.

In step S514, the mobile object 12 starts traveling according to the travel route and schedule and executes the manufacturing plan. Parts and materials are supplied when the mobile object 12 arrives at the supply point. Upon arriving at the meeting point, the mobile object 12 receives the semi-finished product from the mobile object 12 for the previous process. The loading of supplied parts and materials or the delivery of the semi-finished product may be performed by automatic machines or by human labor. As the mobile object 12 travels, the manufacturing process is executed on the semi-finished product by manufacturing apparatuses or workers at the manufacturing facility 30 of the mobile object 12. The manufacturing process may be executed in the manufacturing facility 30 entirely automatically by the manufacturing apparatuses, or some or all of the manufacturing process may be executed by workers. At this time, the necessary parts and materials are used in execution of the manufacturing process. When the mobile object 12 arrives at the meeting point with the mobile object 12 for the next process, the mobile object 12 delivers the semi-finished product to the mobile object 12 for the next process. The mobile object 12 unloads the finished product upon arriving at the destination of the finished product. The unloading of the finished product may be performed by automated machines or manually.

Parts and materials supplied at the supply point have identification information printed thereon or a radio tag attached for identification, and the identification information may be acquired by image recognition or wirelessly through the input interface 35 of the mobile object 12. The mobile object 12 transmits these acquired pieces of information to the server apparatus 10. The server apparatus 10 cross-checks the information against the information on parts and materials included in the manufacturing process information 27 and transmits warning information to the mobile object 12 in a case in which there are incorrect parts or materials. By a worker, for example, checking the warning information outputted by the output interface 36 in the mobile object 12, the true and correct parts and materials can be re-supplied at the supply point.

According to the above-described procedures, the manufacturing process is executed while the mobile object 12 is traveling, and the semi-finished product is sequentially delivered from the mobile object 12 for the previous process to the mobile object 12 for the next process. The product is then completed on the mobile object 12 in which the last manufacturing process is executed, and the product is transported to the destination. Manufacturing processes can thereby be distributed and executed in the traveling mobile objects 12, reducing the need to secure a site for a plant to consolidate a plurality of manufacturing processes. Furthermore, logistics can be improved, because it is possible to receive supplies of parts and materials while manufacturing products and to transfer semi-finished products and finished products.

In the above embodiment, a processing/control program that specifies operations of the mobile object 12 and the information processing apparatus 13 may be stored in the memory 22 of the server apparatus 10 or in the memory of another server apparatus and be downloaded onto each apparatus via the network 11. The processing/control program may also be stored on a non-transitory recording/ storage medium readable by each apparatus, and each apparatus may read the program from the medium.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

Examples of some embodiments of the present disclosure are described below. However, it should be noted that the embodiments of the present disclosure are not limited to these examples.

[Appendix 1] A server apparatus comprising:
a communication interface; and
a controller configured to communicate, using the communication interface, with a mobile object having a facility for executing one or more processes in a plurality of processes to be executed sequentially to manufacture a product, wherein
the controller is configured to transmit an instruction to a first mobile object to travel to a meeting point with a second mobile object for executing a second process that follows a first process to be executed in the first mobile object, the instruction being for delivering the product being manufactured to the second mobile object at the meeting point.

[Appendix 2] The server apparatus according to appendix 1, wherein the controller is configured to set a point at which the second mobile object is located as the meeting point.

[Appendix 3] The server apparatus according to appendix 1 or 2, wherein the controller is configured to set the meeting point between points at which the first mobile object and the second mobile object are located.

[Appendix 4] The server apparatus according to any one of appendices 1 to 3, wherein the controller is configured to instruct the first mobile object which route to travel to the meeting point so as to arrive at the meeting point when the first process is completed.

[Appendix 5] The server apparatus according to appendix 3, wherein the controller is configured to instruct the second mobile object which route to travel to the meeting point.

[Appendix 6] The server apparatus according to any one of appendices 1 to 5, wherein the controller is configured to set a route for the first mobile object so as to pass through a supply point to receive a supply of parts or materials required for the process of the first mobile object.

[Appendix 7] The server apparatus according to any one of appendices 1 to 6, wherein the controller is configured to set a supply point to receive a supply of parts or materials required for the process of the second mobile object as the meeting point.

[Appendix 8] A system comprising a mobile object having a facility for executing one or more processes in a plurality of processes to be executed sequentially to manufacture a product and a server apparatus configured to communicate with the mobile object, wherein
the server apparatus is configured to transmit an instruction to a first mobile object to travel to a meeting point with a second mobile object for executing a second process that follows a first process to be executed in the first mobile object, the instruction being for delivering the product being manufactured to the second mobile object at the meeting point, and
the first mobile object is configured to travel in response to the instruction.

[Appendix 9] The system according to appendix 8, wherein the server apparatus is configured to set a point at which the second mobile object is located as the meeting point.

[Appendix 10] The system according to appendix 8 or 9, wherein the server apparatus is configured to set the meeting point between points at which the first mobile object and the second mobile object are located.

[Appendix 11] The system according to any one of appendices 8 to 10, wherein the server apparatus is configured to instruct the first mobile object which route to travel to the meeting point so as to arrive at the meeting point when the first process is completed.

[Appendix 12] The system according to appendix 10, wherein the server apparatus is configured to instruct the second mobile object which route to travel to the meeting point, and the second mobile object is configured to travel in response to being instructed to travel to the meeting point.

[Appendix 13] The system according to any one of appendices 8 to 12, wherein the server apparatus is configured to set a route for the first mobile object so as to pass through a supply point to receive a supply of parts or materials required for the process of the first mobile object.

[Appendix 14] The system according to any one of appendices 8 to 13, wherein the server apparatus is configured to set a supply point to receive a supply of parts or materials required for the process of the second mobile object as the meeting point.

[Appendix 15] An operating method of a system comprising a mobile object having a facility for executing one or more processes in a plurality of processes to be executed sequentially to manufacture a product and a server apparatus configured to communicate with the mobile object, the operating method comprising:
transmitting, by the server apparatus, an instruction to a first mobile object to travel to a meeting point with a second mobile object for executing a second process that follows a first process to be executed in the first mobile object, the instruction being for delivering the product being manufactured to the second mobile object at the meeting point; and
traveling, by the first mobile object, in response to the instruction.

[Appendix 16] The operating method according to appendix 15, wherein the server apparatus sets a point at which the second mobile object is located as the meeting point.

[Appendix 17] The operating method according to appendix 15 or 16, wherein the server apparatus sets the meeting point between points at which the first mobile object and the second mobile object are located.

[Appendix 18] The operating method according to any one of appendices 15 to 17, wherein the server apparatus instructs the first mobile object which route to travel to the meeting point so as to arrive at the meeting point when the first process is completed.

[Appendix 19] The operating method according to appendix 17, wherein the server apparatus instructs the second mobile object which route to travel to the meeting point, and the second mobile object travels in response to being instructed to travel to the meeting point.

[Appendix 20] The operating method according any one of appendices 15 to 19, wherein the server apparatus sets a route for the first mobile object so as to pass through a supply point to receive a supply of parts or materials required for the process of the first mobile object.

The invention claimed is:

1. A server apparatus comprising: a communication interface; and a controller configured to communicate, using the communication interface, with a plurality of mobile objects each having a facility for executing one or more processes in a plurality of processes to be executed sequentially to manufacture a product, the plurality of mobile objects including a first mobile object assigned to execute a first process in the plurality of processes and a second mobile object assigned to execute a second process in the plurality of processes, the second process following the first process, wherein the controller is further configured to set a first travel route for the first mobile object to travel to a meeting point with the second mobile object, upon determining that the first mobile object, if traveling on the first travel route, arrives at the meeting point before the first process is completed, change the first travel route to a second travel route that requires a longer travel time for the first mobile object to travel to the meeting point than the first travel route, so that the first mobile object, if traveling on the second travel route, arrives at the meeting point when the first process is completed, and control, by transmitting a first instruction to the first mobile object, the first mobile object to travel on the second travel route, arrive at the meeting point when the first process is completed, and deliver the product being manufactured to the second mobile object at the meeting point.

2. The server apparatus according to claim 1, wherein the controller is further configured to set a point at which the second mobile object is located as the meeting point.

3. The server apparatus according to claim 1, wherein the controller is further configured to set the meeting point between points at which the first mobile object and the second mobile object are located.

4. The server apparatus according to claim 3, wherein the controller is further configured to instruct the second mobile object which route to travel to the meeting point.

5. The server apparatus according to claim 1, wherein the controller is further configured to set the first travel route for the first mobile object so as to pass through a supply point to receive a supply of parts or materials required for the first process of the first mobile object.

6. The server apparatus according to claim 1, wherein the controller is further configured to set a supply point to receive a supply of parts or materials required for the second process of the second mobile object as the meeting point.

7. The server apparatus according to claim 1, wherein the controller is further configured to upon determining that the first mobile object, if traveling on the first travel route, arrives at the meeting point when or after the first process is completed, not change the first travel route to the second travel route, and control, by transmitting a second instruction to the first mobile object without transmitting the first instruction to the first mobile object, the first mobile object to travel on the first travel route, arrive at the meeting point when or after the first process is completed, and deliver the product being manufactured to the second mobile object at the meeting point.

8. The server apparatus according to claim 1, wherein the controller is further configured to, when the plurality of mobile objects include two or more mobile objects capable of executing the second process, select one of the two or more mobile objects which is located closest to a current position of the first mobile object as the second mobile object.

9. A system comprising a plurality of mobile objects each having a facility for executing one or more processes in a plurality of processes to be executed sequentially to manufacture a product, and a server apparatus configured to communicate with the plurality of mobile object objects, wherein the plurality of mobile objects includes a first mobile object assigned to execute a first process in the plurality of processes and a second mobile object assigned to execute a second process in the plurality of processes, the second process following the first process, the server apparatus is further configured to set a first travel route for the first mobile object to travel to a meeting point with the second mobile object, upon determining that the first mobile object, if traveling on the first travel route, arrives at the meeting point before the first process is completed, change the first travel route to a second travel route that requires a longer travel time for the first mobile object to travel to the meeting point than the first travel route, so that the first mobile object, if traveling on the second travel route, arrives at the meeting point when the first process is completed, and control, by transmitting a first instruction to the first mobile object, the first mobile object to travel on the second travel route, arrive at the meeting point when the first process is completed, and deliver the product being manufactured to the second mobile object at the meeting point.

10. The system according to claim 9, wherein the server apparatus is further configured to set a point at which the second mobile object is located as the meeting point.

11. The system according to claim 9, wherein the server apparatus is further configured to set the meeting point between points at which the first mobile object and the second mobile object are located.

12. The system according to claim 11, wherein the server apparatus is further configured to instruct the second mobile object which route to travel to the meeting point.

13. The system according to claim 9, wherein the server apparatus is further configured to set the first travel route for the first mobile object so as to pass through a supply point to receive a supply of parts or materials required for the first process of the first mobile object.

14. The system according to claim 9, wherein the server apparatus is further configured to set a supply point to receive a supply of parts or materials required for the second process of the second mobile object as the meeting point.

15. An operating method of a server apparatus configured to communicate with a plurality of mobile objects each having a facility for executing one or more processes in a plurality of processes to be executed sequentially to manufacture a product, the plurality of mobile objects including a first mobile object assigned to execute a first process in the plurality of processes and a second mobile object assigned to execute a second process in the plurality of processes, the second process following the first process, the operating method comprising: setting a first travel route for the first mobile object to travel to a meeting point with the second mobile object upon determining that the first mobile object, if traveling on the first travel route, arrives at the meeting point before the first process is completed, changing the first travel route to a second travel route that requires a longer travel time for the first mobile object to travel to the meeting point than the first travel route, so that the first mobile object, if traveling on the second travel route, arrives at the meeting point when the first process is completed, and controlling, by transmitting, a first instruction to the first mobile object, the first mobile object to travel on the second travel route, arrive at the meeting point when the first process is completed, and deliver the product being manufactured to the second mobile object at the meeting point.

16. The operating method according to claim 15, further comprising setting a point at which the second mobile object is located as the meeting point.

17. The operating method according to claim 15, further comprising setting the meeting point between points at which the first mobile object and the second mobile object are located.

18. The operating method according to claim 17, further comprising instructing the second mobile object which route to travel to the meeting point.

19. The operating method according to claim 15, wherein setting the first travel route comprises setting the first travel route for the first mobile object so as to pass through a supply point to receive a supply of parts or materials required for the first process of the first mobile object.

20. The operating method according to claim 15, further comprising: setting a supply point to receive a supply of parts or materials required for the second process of the second mobile object as the meeting point.

* * * * *